US012509264B2

(12) United States Patent
Case

(10) Patent No.: US 12,509,264 B2
(45) Date of Patent: Dec. 30, 2025

(54) CAPSULE ORIENTATION AND LOADING SHEET FOR MANUAL CAPSULE FILLING MACHINES

(71) Applicant: Phillip J Case, Milwaukee, WI (US)

(72) Inventor: Phillip J Case, Milwaukee, WI (US)

( * ) Notice: Subject to any disclaimer, the term of this patent is extended or adjusted under 35 U.S.C. 154(b) by 0 days.

(21) Appl. No.: 18/928,028

(22) Filed: Oct. 27, 2024

(65) Prior Publication Data

US 2025/0388354 A1 Dec. 25, 2025

Related U.S. Application Data

(60) Provisional application No. 63/661,839, filed on Jun. 19, 2024.

(51) Int. Cl.
*B65B 43/54* (2006.01)
*A61J 3/07* (2006.01)

(52) U.S. Cl.
CPC ............... *B65B 43/54* (2013.01); *A61J 3/074* (2013.01)

(58) Field of Classification Search
CPC .... A61J 3/07; A61J 3/071; A61J 3/074; A61J 3/075; Y10S 53/90
USPC ........... 53/454, 246, 560, 900; 141/246, 247
See application file for complete search history.

(56) References Cited

U.S. PATENT DOCUMENTS 899,761 A * 9/1908 Remington ............. B65B 67/10 53/900
1,073,286 A * 9/1913 Remington ............. A61J 3/075 141/246
1,155,023 A * 9/1915 Winchester ............. B65B 67/10 141/237
1,567,639 A * 12/1925 Eastman ................. A61J 3/075 141/246
2,322,169 A * 6/1943 Smith ..................... A61J 3/075 53/437
3,552,095 A * 1/1971 Inman ..................... A61J 3/075 53/900
4,884,602 A * 12/1989 Yamamoto et al. .... A61J 3/074 141/238
5,329,749 A * 7/1994 Yamamoto et al. .... A61J 3/074 53/900
11,369,546 B2 * 6/2022 Gall et al. ............... A61J 3/074
2007/0130890 A1 * 6/2007 Barrett et al. .......... A61J 3/075 53/900
2016/0338914 A1 * 11/2016 Calvert et al. .......... A61J 3/074
(Continued)

FOREIGN PATENT DOCUMENTS

CN 108743390 A * 11/2018 .............. A61J 3/074

*Primary Examiner* — Stephen F. Gerrity
(74) *Attorney, Agent, or Firm* — UNDERWOOD & ASSOCIATES, LLC

(57) ABSTRACT

The present invention relates generally to a capsule placement system. The system comprises a capsule sheet (102, 202) configured to accommodate a plurality of capsule elements (106, 206), wherein the capsule sheet (102, 202) comprises a plurality of apertures (104, 204) arranged in a grid pattern, each of the plurality of apertures (104, 204) configured to securely hold and position a corresponding capsule element (106, 206) of the plurality of capsule elements (106, 206) in an upright orientation. This allows the user of a manual capsule filling machine to place all the required capsule elements i.e., capsule caps and capsule bodies into their capsule filling machine simultaneously, without having to individually place them or shake them into place.

18 Claims, 11 Drawing Sheets

(56) References Cited

U.S. PATENT DOCUMENTS

| | | | | |
|---|---|---|---|---|
| 2021/0154099 | A1* | 5/2021 | Cao et al. ............... | A61J 3/074 |
| 2022/0401371 | A1* | 12/2022 | Cao et al. ............... | A61J 3/074 |

* cited by examiner

CAPSULE ORIENTATION AND LOADING SHEET FOR MANUAL CAPSULE FILLING MACHINES

CROSS-REFERENCE TO RELATED APPLICATIONS

This application claims priority to provisional patent application No. 63/661,839, filed on Jun. 19, 2024, the contents of which are incorporated by reference in their entirety.

TECHNICAL FIELD

The present invention relates to the field of pharmaceutical and dietary supplement manufacturing, specifically to a capsule placement system designed for the alignment, placement, and release of hard-shell capsules into a manual capsule filling machine. The present invention relates a sheet having a plurality of apertures, wherein each of the plurality of apertures are configured to secure a part (capsule cap or capsule body) of a separated capsule by its locking ring.

BACKGROUND OF THE INVENTION

Manual capsule filling machines are commonly used in the pharmaceutical and dietary supplement industries to efficiently and accurately fill capsules with various substances. These machines require the precise placement of empty capsules into a tray containing multiple receptacles. However, the current systems often involve manual handling of capsules, which can be time-consuming, labor-intensive, and prone to errors, such as misalignment or accidental spillage.

Several solutions have been developed to enhance the efficiency and speed of loading empty hard-shell capsules into manual capsule filling machines. Some of these solutions rely on the natural shape and weight of the capsules, allowing them to self-orient in a tray with holes after a large number of capsules are poured in and the tray is shaken. Despite this, these methods fail to significantly speed up the loading process and still require considerable manual intervention to reorient capsules that have landed upside down in their respective holes. Other solutions introduce capsule orientation mechanisms that assist in correctly positioning the capsules, thereby reducing the need for manual adjustment before filling. There solutions operate manual machines designed to separate capsules and manual machines that require separated capsules. However, these solutions still demand substantial time and user interaction to load the full capacity of the capsule filling machine.

Some recent solutions propose utilization of a transport sheet that hold capsules such that these transport sheets are fed into customized machines that have mechanisms to separate the parts of capsule i.e., the capsule cap from the body of capsule, to perform the further steps of orientation and filling. However, such transport sheets are utilized/beneficial only for limited and advanced customized machines, but are not useful for manual capsule filling machines as they require each half to be placed in separately which is currently performed manually.

Consequently, some users choose to bypass these methods altogether and manually place each capsule into the holes. In a machine designed to fill 100 capsules, this would require handling 100 capsule bodies and 100 capsule tops multiple times, which is highly time-consuming and necessitates significant user effort.

In many online instructional videos, it is a common complaint by users that the time required to shake capsules into place (and reorient a large percentage of those capsules) forces them to manually place each capsule in the machine. The most challenging and cumbersome part of using manual capsule filling machines remains the process of loading all the capsules into their respective holes in the trays.

Therefore, there is a need for an improved mechanism for efficiently loading the total quantity of capsules in the capsule filling machine while addressing the aforementioned challenges.

SUMMARY

The present invention relates generally to the field of capsule filling machines, and more particularly to a thin plastic sheet designed for facilitating the placement of capsule elements in manual capsule filling machines. This allows the user of a manual capsule filling machine to place all the required capsule elements i.e., capsule caps and capsule bodies into their capsule filling machine simultaneously, without having to individually place them or shake them into place. The capsule sheet comprises a plurality of apertures arranged in a predetermined pattern to match the layout of the loading tray of the filling machine. Each aperture is configured to hold a capsule cap or a capsule body in an upright position, allowing for efficient and accurate filling operations. The diameter of each of the apertures is slightly larger than the diameter of the capsule, but small enough to allow the capsule to "lock" into place at the body locking ring. The invention provides a simple yet effective solution for improving productivity and reducing errors in manual capsule filling processes.

Aspects of the present invention relates to a specialized sheet designed to securely hold capsule halves, facilitating easier and faster loading into manual capsule-filling machines. Following are the key features of the specialized sheet:

Sheet with openings (interchangeably referred to as "apertures") for Capsule Halves: The sheet is engineered with specific openings that align with the capsule halves. These openings are configured to secure either the capsule cap or the capsule body by engaging with their respective locking rings.

Use of Locking Rings: The locking rings, which are integral to the design of the capsule caps and bottoms, are employed to secure each capsule half within the sheet. This ensures that the capsule halves remain upright and stable within the sheet during transportation and handling.

Pre-loaded Capsule Sheets: Instead of purchasing loose capsules, users can obtain pre-loaded sheets where each capsule half is already positioned correctly. This allows for quick and efficient placement into manual capsule-filling machines, which require separate loading of capsule caps and bottoms. This feature could also be beneficial for manual machines that additionally provide functionality to separate pre-joined capsules. It can save time by eliminating the need to shake and load the machine multiple times to fill all rows and separate the materials, streamlining the process and enhancing efficiency.

Controlled Release Mechanism: The design ensures that the capsule halves remain securely in place within the sheet until the user applies the appropriate pressure to release them. This prevents accidental dislodging during handling.

Improvement Over Conventional Sheets: Unlike traditional sheets that hold complete capsules and rely on machinery to separate the halves, this invention focuses on manual filling processes. The separate sheets for the top and bottom halves allow for quick and efficient loading into manual machines, significantly speeding up the capsule-filling process.

More precisely, the advancement lies in the utilization of a combination of the locking ring to secure in apertures provided in the plastic sheet to orient and secure capsule halves, specifically, but not essentially, for manual capsule-filling machines. This approach eliminates the need for complex machinery and allows users to load capsules more efficiently.

In an aspect, a capsule sheet for capsule-filling machines is disclosed. The capsule sheet having a plurality of openings configured to secure a capsule cap or a capsule bottom by engaging with a locking ring of the capsule cap or capsule bottom. The locking ring of the capsule cap or capsule bottom is utilized to maintain the upright orientation of the capsule half within the aperture.

In this aspect, each of the plurality of capsule elements includes a locking ring configured to allow locking between the capsule element and the corresponding aperture to allow the corresponding aperture to securely hold and position the capsule element.

The capsule sheet having a plurality of apertures configured to secure a capsule cap or a capsule body by engaging with a locking ring of the capsule cap or capsule body. The locking ring of the capsule cap or capsule body is utilized to maintain the upright orientation of the capsule half within the aperture.

In this aspect, the capsule sheet is pre-loaded with either capsule caps or capsule bodies to allow for efficient placement into a capsule filling machine.

In this aspect, the capsule halves are releasable from the sheet only upon the application of a predetermined pressure. In an embodiment, each of the capsule elements being releasable from the corresponding apertures upon application of a predetermined pressure on the capsule elements. In another embodiment, each of the capsule elements are configured to be released from the capsule sheet by a downward pressure exerted by a capsule filling machine, allowing for automated release and filling of the capsule elements.

In another aspect, a system for capsule filling is disclosed. The system includes a first sheet configured to hold a plurality of capsule caps, and a second sheet configured to hold a plurality of capsule bodies. Each sheet (the first sheet and the second sheet) has a plurality of apertures designed to engage with the locking rings of the respective capsule caps or bottoms. The locking rings secure each capsule half in an upright orientation within the apertures during transportation and handling. The capsule halves being designed to remain securely in place until released by applying a specific pressure.

In this aspect, the sheet is made from a flexible or semi-rigid plastic material that provides sufficient structural support to maintain the upright orientation of the capsule halves during transportation and handling.

In this aspect, the apertures in the sheet are dimensioned to provide a snap-fit engagement with the locking rings of the capsule caps or bottoms, enhancing the stability of the capsules during use.

In this aspect, the sheet is pre-loaded with capsule halves arranged in a grid pattern, allowing for simultaneous placement of multiple capsules into a manual capsule-filling machine.

In this aspect, the sheets are designed to be stackable, enabling the user to load multiple sheets sequentially into a capsule-filling machine without the need for manual handling of individual capsule halves.

In this aspect, the system also includes visual or tactile indicators on the sheet to assist the user in correctly orienting and aligning the sheet with the manual capsule-filling machine.

In this aspect, the capsule halves are designed to be released from the sheet by a downward pressure exerted by the filling machine, allowing for automated release and filling of the capsule halves.

In another aspect, the present invention relates to a capsule placement system. The system may include a capsule sheet configured to accommodate a plurality of capsule elements. The capsule sheet comprises a plurality of apertures arranged in a grid pattern. Each of the plurality of apertures is configured to securely hold and position a corresponding capsule element of the plurality of capsule elements in an upright orientation.

In this aspect, each of the plurality of capsule elements comprises a locking ring configured to allow locking between the capsule element and the corresponding aperture to allow the corresponding aperture to securely hold and position the capsule element.

In this aspect, each capsule element comprises a capsule body, wherein diameter of the locking ring of the capsule body is less than diameter of rest of the capsule body, and wherein the diameter of each aperture is equal to or larger than the rest of the capsule body.

In this aspect, each capsule element comprises a capsule cap, wherein diameter of the locking ring of the capsule cap is less than diameter of rest of the capsule cap, and wherein the diameter of each aperture is equal to the diameter of the locking ring of the capsule cap.

In this aspect, the system may include a capsule filling tray associated with a corresponding grid pattern so as to receive the plurality of capsule elements from the capsule sheet.

In this aspect, the system may include a tamper removably coupled with the sheet on the upper side of the sheet to inject each capsule element from the capsule sheet into the capsule filling tray. The tamper pushes down and the release tray pulls up, keeping the capsules in the holes and releasing from the sheet.

In this aspect, the tamper comprises a plurality of tamper pegs, each tamper leg configured to be inserted within a corresponding capsule element of the plurality of capsule elements.

In this aspect, the tamper pegs are arranged in a second grid pattern matching with the grid pattern of the plurality of apertures.

In this aspect, the system may include a release tray removably coupled with the capsule filling tray and the capsule sheet, and wherein during the injection of the capsule elements from the capsule sheet to the capsule filling tray, tamper and the release tray are moved towards each other, causing injection of the capsule elements from the capsule sheet to the capsule filling tray.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
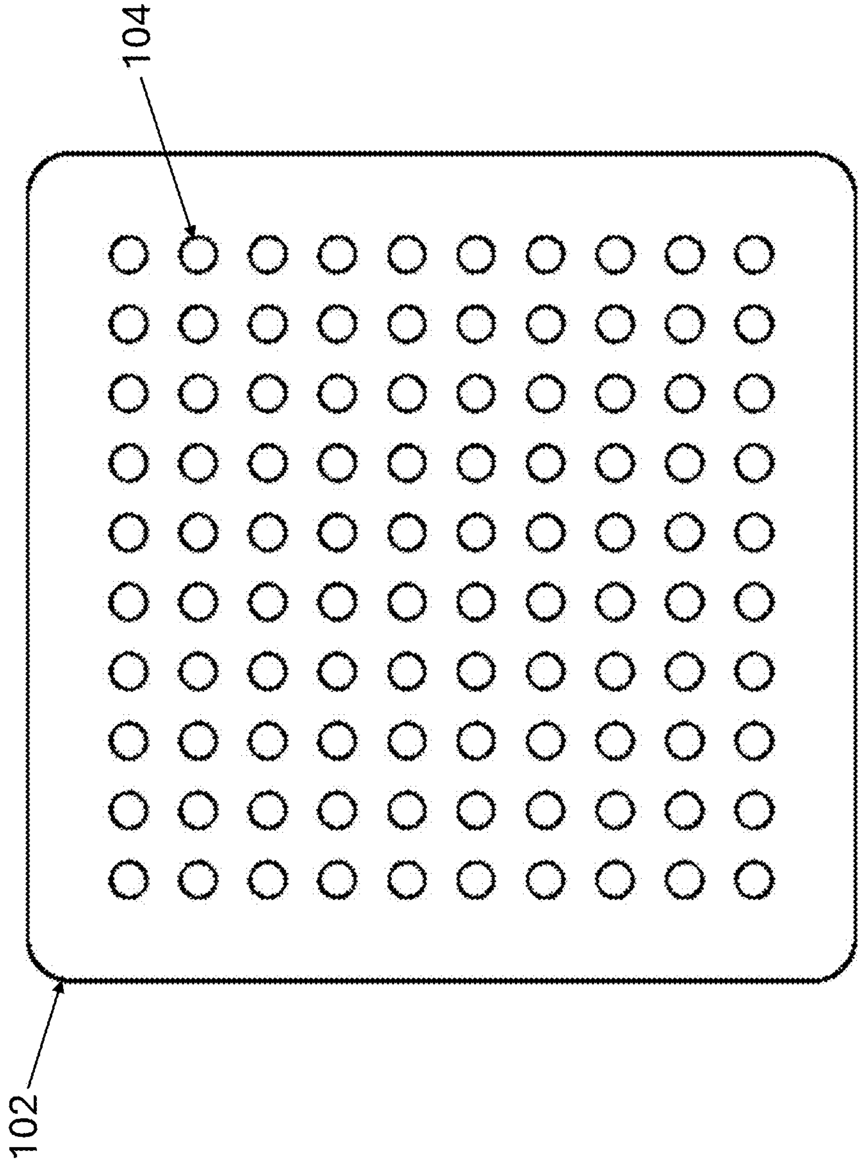
FIG. 1 is a diagram illustrating a top view of the capsule body sheet with a grid of capsule body apertures, in accordance with exemplary embodiments of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

If the specification states a component or feature "may", "can", "could", or "might" be included or have a characteristic, that particular component or feature is not required to be included or have the characteristic.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Various terms are used herein. To the extent a term used in a claim is not defined, it should be given the broadest definition persons in the pertinent art have given that term as reflected in printed publications and issued patents at the time of filing.

The term "capsule element" generally refers to an element of the capsule such as a capsule cap or capsule body.

The present disclosure provides a capsule placement system that comprises a thin plastic sheet designed with a plurality of apertures arranged in a grid pattern to hold and position capsule elements in an upright orientation utilizing the locking ring of capsule elements to hold them in the sheet. This system facilitates the efficient transfer of capsule elements into a manual capsule filling machine that has a corresponding grid pattern. A complementary plastic grid system is included, designed to interact with the sheet to aid in the release and alignment of the capsules directly into the capsule filling tray.

It is desirable to load manual capsule filling trays efficiently, quickly, and accurately so that all hard-shell gelatin capsule tops and bottoms are seated in their appropriate holes in the filling trays to be filled with various substances. Furthermore, it would also be desirable to have a capsule loading system/method that reduces the amount of touching each capsule by hand, which can increase the time to load a tray as well as introduce potential contaminants. In addition, if any holes in the manual capsule filling machine trays have capsules that are incorrectly oriented (i.e. upside down), or a hole that is missing a capsule, the resulting batch of completed/filled capsules will be deficient in that quantity of completed capsules. Lastly, it is desirable to have a solution that is affordable for small manual filling operations and that doesn't require large and expensive automatic capsule orientation equipment. Therefore, there currently exists a need in the industry for a cost-effective solution to quickly load the total quantity of capsules that the manual capsule filling machine is designed to produce.

The present disclosure provides a capsule placement system and method for loading capsule elements such as capsule body and capsule cap into manual capsule filling machines. The system can include a capsule sheet, a capsule release tray, and a tamper.

The capsule sheet can be a thin plastic sheet and can have a thickness of approximately 6 mils. However, the thickness can be varied based on application. The capsule sheet can include a grid of uniformly spaced apertures having an arrangement pattern matching with arrangement pattern of the apertures of the capsule filling tray.

The capsule release tray can have a plurality of holes arranged in the pattern that matches with a pattern of apertures of both the capsule sheet and the manual capsule filling machine tray (interchangeably referred to as "capsule filling tray"). The capsule filling tray may include the apertures having a diameter slightly larger than each capsule element. The capsule release tray may be removably coupled between the capsule sheet and the capsule filling tray.

The tamper can have a plurality of pegs having length, for example, 1" long. The arrangement pattern of the pegs in the temper is similar to the pattern of apertures in the capsule sheet, the capsule release tray, and the capsule filling tray. The pegs of the tampers are allowed to be inserted in each capsule element to apply downward pressure and the release tray is allowed to apply the upward pressure, so that the upward pressure from the capsule release tray releases the capsule elements from the capsule sheet, while the downward pressure directs them into the capsule filling tray of the manual capsule filling machine.

The device may also have one or more of the following: (1) a raised portion in each of the four corners of the manual capsule filling machine that align to corresponding apertures in the four corners of the capsule sheet so that when the capsule sheet is placed on the tray, the sheet aligns perfectly with the tray; (2) raised bumps/sections at the intersection of each aperture on the capsule release plate that apply upward pressure to the capsule sheet and assists in the release of the capsule caps and capsule bodies from the capsule sheet into the manual capsule filling machine tray; (3) portions on the capsule release tray that extend from the outer perimeter of the tray that act as handles and provide leverage will pulling the capsule release plate upwards. The locking ring aids in keeping the capsule cap and capsule body upright. The locking ring also prevents the capsule body and capsule cap from unintentionally being removed from the capsule sheet.

The proposed system significantly reduces the time and effort required to align and insert capsule caps and capsule bodies into a manual filling machine. It also minimizes the risk of misalignment and damage to capsule caps and capsule bodies, thus increasing efficiency and reliability in capsule filling operations.

The proposed device is unique when compared to other known devices and solutions because it provides a device and method to load all 100 capsule bodies/bodies and all 100 capsule tops/caps into the tray at one time rather than shaking them into place or manually inserting capsule caps and capsule bodies into the holes in the manual capsule filling trays. Further, the proposed device can be implemented for example but not limited to manual capsule filling machines with a 10×10 orientation, and total capacity of 100 capsules. However, the device can be implemented for capsule filling machines with higher or lower capacities such as 300 or 400 capsules.

There are fully automatic machines that orient and load capsules into metal trays, but these are expensive pieces of equipment which are cost-prohibitive in many circumstances and are not designed for consumer use capsule filling machines. The disclosed device allows a user to load the hard-shell gelatin capsule caps and capsule bodies into a manual capsule filling machine in a matter of seconds instead of minutes.

The disclosed device is superior to other known loading methods because it aligns all capsule caps and capsule bodies (collective referred to as assembled capsules and individually referred to as capsule elements) in the correct and upright/perpendicular orientation so that a user does not need to manually orient the capsules in any way. The capsule sheet has an aperture for each capsule cap and capsule body that is to be loaded into the manual capsule filling machine. The apertures of the capsule sheet are designed to have just a slightly smaller or the same diameter as the locking ring of a capsule cap and a capsule body, so that the capsules "lock" into place securely.

Capsule elements are placed manually or mechanically into the apertures of the plastic sheet while it is in an upright position. Within the capsule sheet, all the capsule elements are correctly oriented. The sheet, now holding the capsule elements, is aligned over the tray of the manual capsule filling machine, with the capsule release tray placed between the capsule filling tray and the capsule sheet. To achieve this configuration, a user can place a capsule release tray over the capsule filling tray and then the capsule sheet over the capsule release tray. A temper is then placed over the capsule sheet and a first force is applied on the temper in downward direction and a second force on the capsule release tray is applied in the upward direction. Applying a uniform force on the grid system through the temper and release tray facilitates the smooth release of the capsules from the sheet into the corresponding holes of the capsule filling trays (one for the caps, and one for the bodies) in the capsule filling machine.

FIG. 1 depicts a top view of an empty capsule sheet (102) (interchangeably referred to as capsule sheet (102)) with a grid arrangement of 100 capsule body apertures (104) to accommodate 100 capsule bodies (106) arranged in a 10×10 grid. The capsule body can be made up of hard-shell gelatin. However, the invention is not limited to capsules with a gelatin body; it can be applied to capsules made from any hard-shell material.

In an embodiment, the capsule sheet (102) can be composed of a flexible yet sturdy plastic material with a thickness of approximately 6 mils. The capsule sheet (102) can include a matrix of 100 apertures organized in a 10×10 grid pattern. Each aperture is precisely sized to snugly accommodate a standard size capsule cap or capsule body in an upright/perpendicular orientation and utilizes the locking ring of the capsule cap and capsule body to snap into place in the sheet (102).

In an exemplary embodiment, the size of the grid on the sheet is adaptable to match manual capsule filling machines designed to fill 300, 400, or 800 capsules, thus the sheet is available in multiple configurations (e.g., 10×30 for 300 capsules, 10×40 for 400 capsules, and 20×40 for 800 capsules).

In an exemplary embodiment, the apertures (104) of the capsule sheet (102) can be designed to match the hole pattern of a capsule filling tray. It assists in the accurate and efficient release of the capsules from the sheet into the filling machine.

In an embodiment, the grid system of the plastic sheet aligns with the capsule filling tray and provides an even force distribution across the back of the sheet when pressed, ensuring that all capsules are uniformly released into the tray of the filling machine without misalignment or damage.

While the embodiments explained herein are linked to 10×10 grid, they are merely exemplary embodiments. The capsule sheet (102) can also be implemented for any dimensions without departing from the scope of the invention.

In another embodiment, a capsule sheet for capsule-filling machines is disclosed. The capsule sheet having a plurality of apertures configured to secure a capsule cap or a capsule body by engaging with a locking ring of the capsule cap or capsule body. The locking ring of the capsule cap or capsule body is utilized to maintain the upright orientation of the capsule half within the aperture.

In an exemplary embodiment, the capsule sheet is pre-loaded with either capsule caps or capsule bodies to allow for efficient placement into a capsule filling machine.

In an exemplary embodiment, the capsule halves are releasable from the sheet only upon the application of a predetermined pressure.

In yet another embodiment, a system for capsule filling is disclosed. The system includes a first sheet configured to hold a plurality of capsule caps, and a second sheet configured to hold a plurality of capsule bodies. Each sheet (the first sheet and the second sheet) has a plurality of apertures designed to engage with the locking rings of the respective capsule caps or bottoms. The locking rings secure each capsule half in an upright orientation within the apertures during transportation and handling. The capsule halves being designed to remain securely in place until released by applying a specific pressure.

In an exemplary embodiment, the sheet is made from a flexible or semi-rigid plastic material that provides sufficient structural support to maintain the upright orientation of the capsule halves during transportation and handling.

In an exemplary embodiment, the apertures in the sheet are dimensioned to provide a snap-fit engagement with the locking rings of the capsule caps or bottoms, enhancing the stability of the capsules during use.

In an exemplary embodiment, the sheet is pre-loaded with capsule halves arranged in a grid pattern, allowing for simultaneous placement of multiple capsules into a manual capsule-filling machine.

In an exemplary embodiment, the sheets are designed to be stackable, enabling the user to load multiple sheets sequentially into a capsule-filling machine without the need for manual handling of individual capsule halves.

In an exemplary embodiment, the system also includes visual or tactile indicators on the sheet to assist the user in correctly orienting and aligning the sheet with the manual capsule-filling machine.

In an exemplary embodiment, the capsule halves are designed to be released from the sheet by a downward pressure exerted by the filling machine, allowing for automated release and filling of the capsule halves.

Figure 2:
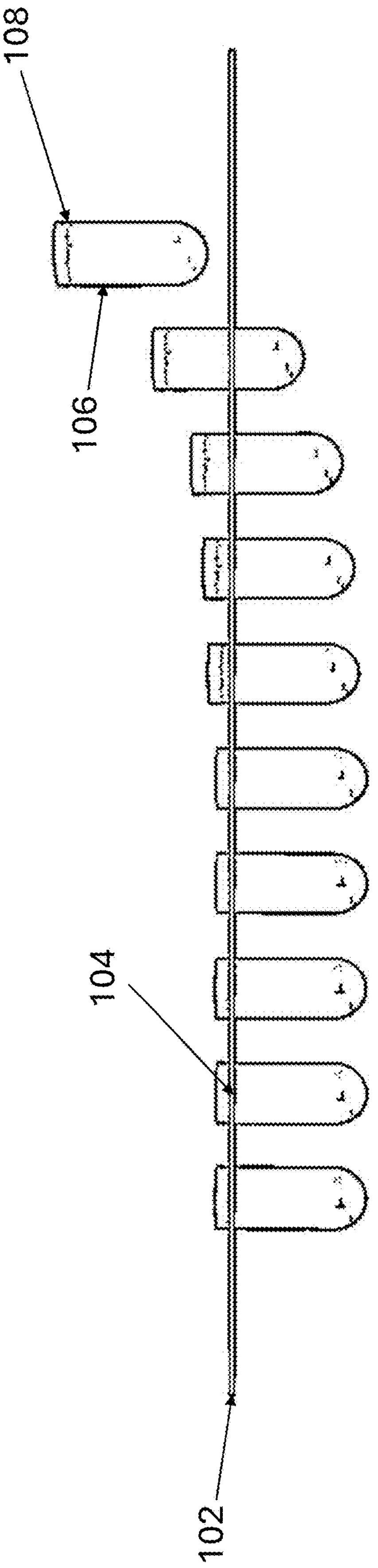
FIG. 2 is a diagram illustrating a side view of the capsule body sheet with the bottom half (aka body) of the capsules, in accordance with embodiments of the present disclosure.

FIG. 2 illustrates a side view of an embodiment of capsule body sheet (102) with the capsule bodies (106) of the capsules inserted into the capsule body apertures (104) of the capsule body sheet (102), utilizing the capsule body locking ring (108) of the capsule body (106) to secure it into the capsule body sheet (102).

Figure 3:
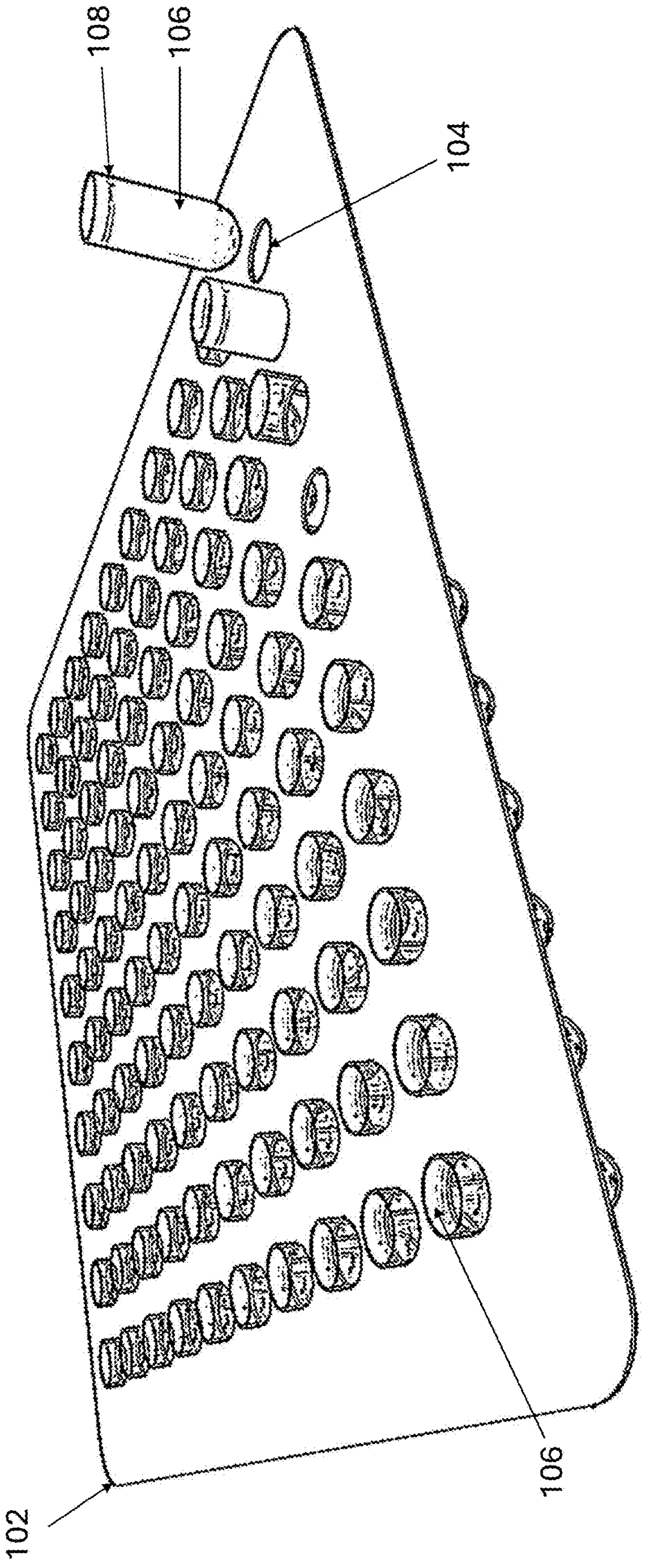
FIG. 3 is a diagram illustrating a perspective view of the capsule body sheet with the bottom half (aka body) of the capsules, in accordance with embodiments of the present disclosure.

FIG. 3 depicts a perspective view of capsule sheet (102), with 100 capsule bodies (106) secured into the capsule sheet (102) utilizing locking ring (108) of the capsule body (106) to lock into the aperture (104) of the capsule sheet (102).

Figure 4:
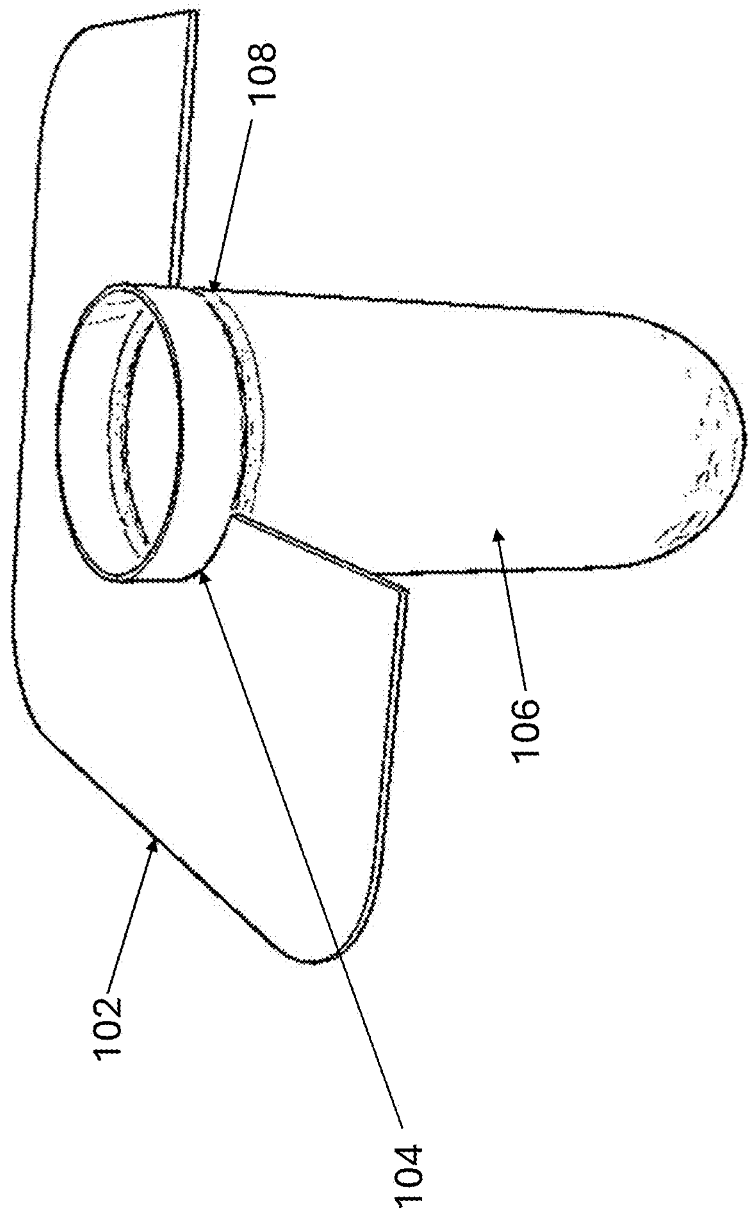
FIG. 4 is a diagram illustrating a cross-section of the bottom half (aka body) of a capsule fitting into the capsule body sheet, in accordance with embodiments of the present disclosure.

FIG. 4 depicts a cross-section of the capsule body sheet (102) to show how a capsule body element (106) can fit into the capsule body sheet (102) securely, using the locking ring (108) of the capsule body (106). The capsule body sheet (102) is pliable, and the capsule body apertures (104) are flexible to accommodate the passthrough of the capsule bodies (106) under the application of a slight force/pressure.

Figure 5:
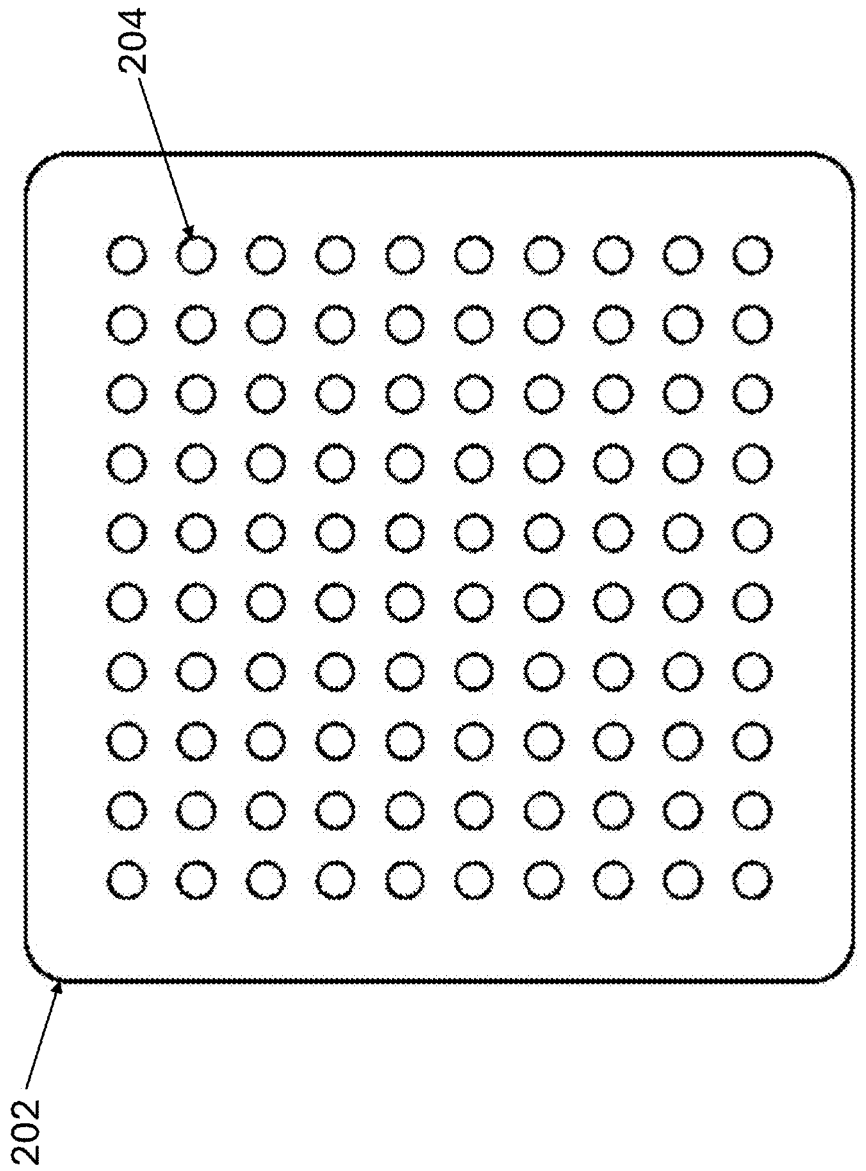
FIG. 5 is a diagram illustrating a top view of the capsule cap sheet with a grid of 10×10 capsule cap apertures, in accordance with embodiments of the present disclosure.

FIG. 5 depicts a top view of an empty capsule cap sheet (202) (interchangeably referred to as capsule sheet (202)) with a grid arrangement of 100 capsule cap apertures (204) to accommodate 100 capsule caps (106) arranged in a 10×10 grid. The capsule cap sheet (202) is similar to capsule body sheet (102).

Figure 6:
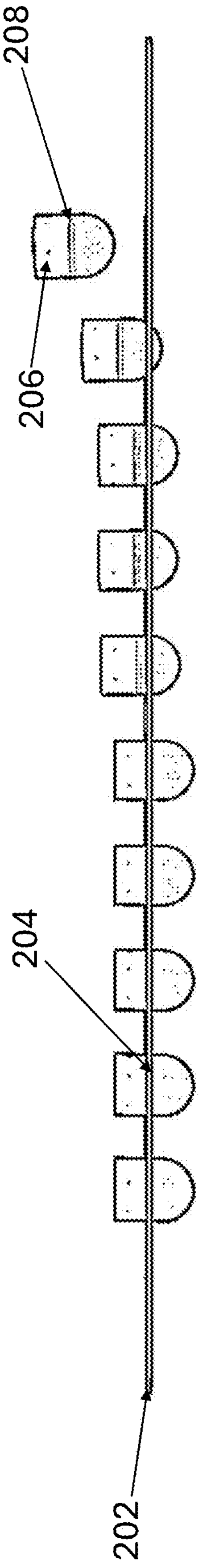
FIG. 6 is a diagram illustrating a side view of the capsule cap sheet with the top half (aka cap) of the capsules, in accordance with embodiments of the present disclosure.

FIG. 6 illustrates a side view of an embodiment of capsule cap sheet (202) with the capsule caps (206) of the capsules inserted into the capsule cap apertures (204) of the capsule cap sheet (202), utilizing the capsule cap locking ring (208) of the capsule cap (206) to secure it into the capsule cap sheet (202).

Figure 7:
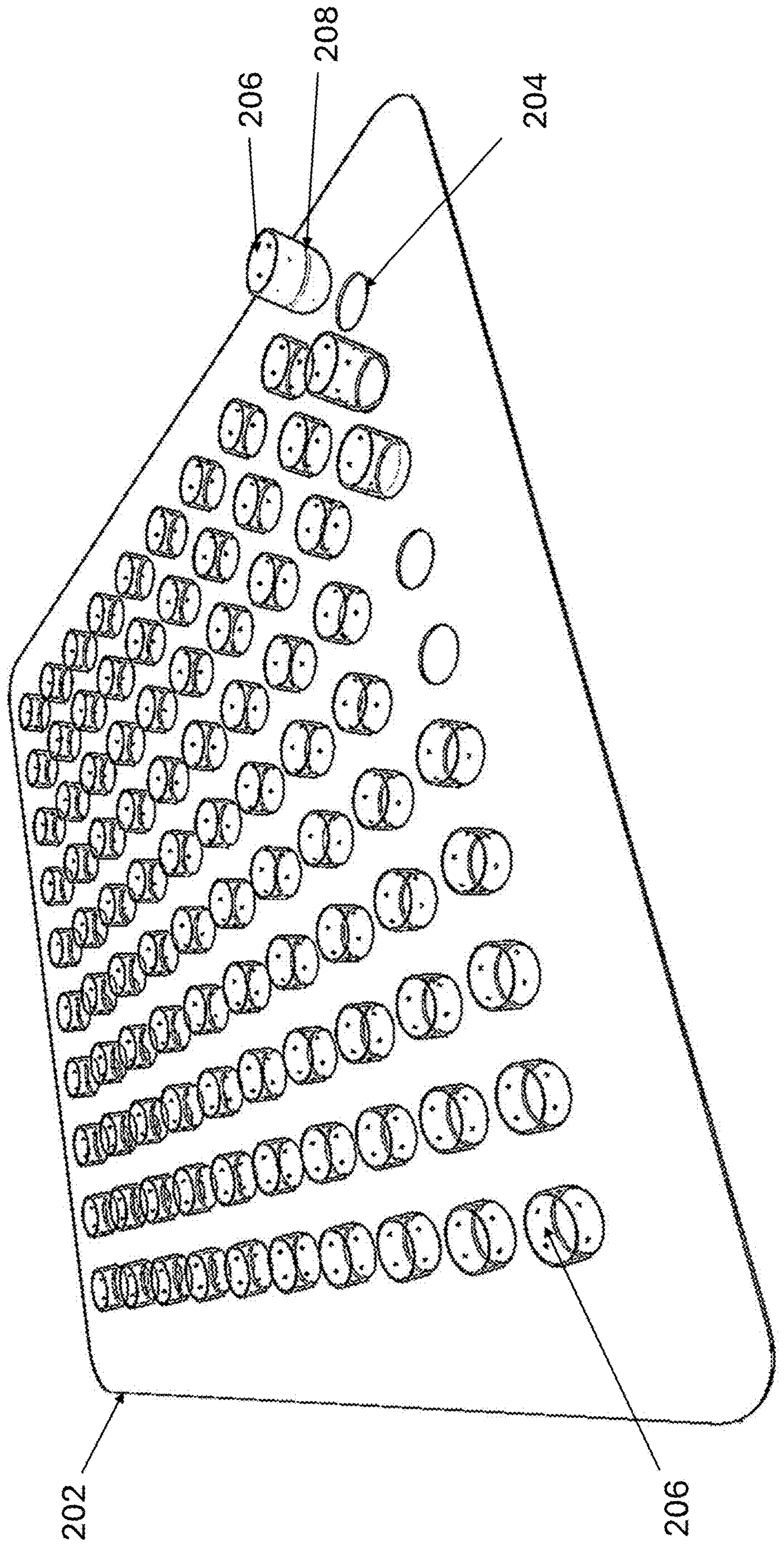
FIG. 7 is a diagram illustrating a perspective view of the capsule cap sheet with the top half (aka cap) of the capsules, in accordance with embodiments of the present disclosure.

FIG. 7 depicts a perspective view of capsule cap sheet (202), with 100 capsule caps (206) secured into the capsule cap sheet (202) utilizing the capsule cap locking ring (208) of a capsule cap (206) to lock into the capsule cap aperture (204) of the capsule cap sheet (202).

Figure 8:
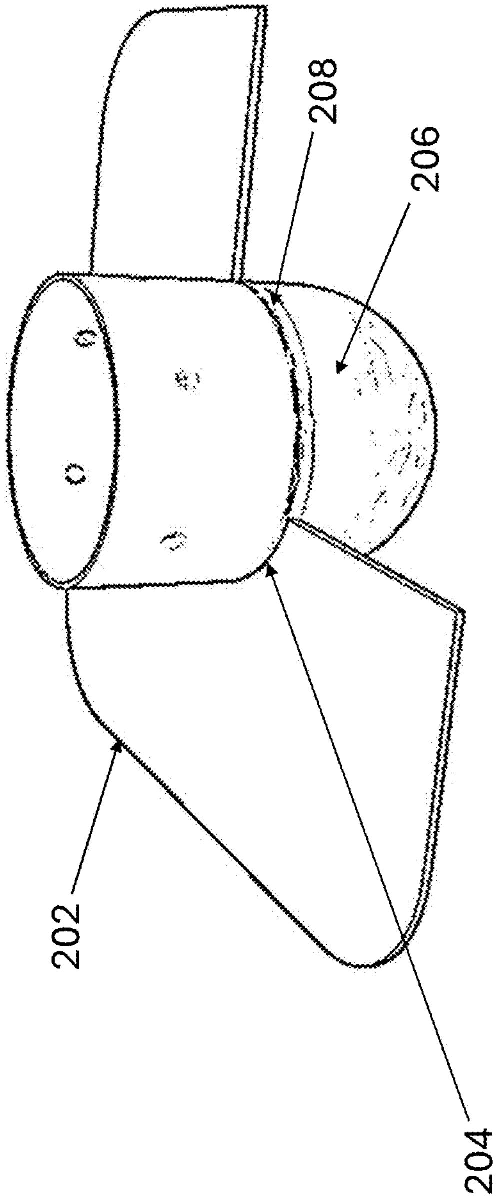
FIG. 8 is a diagram illustrating a cross-section of the top half (aka cap) of a capsule fitting into the capsule cap sheet, in accordance with embodiments of the present disclosure.

FIG. 8 depicts a cross-section of capsule sheet (202) to show how a capsule cap (206) fits into the capsule cap sheet (202) securely, using the locking ring (208) of the capsule cap (206). The capsule cap sheet (202) is pliable, and the apertures (204) of the capsule sheet (202) are flexible to accommodate the passthrough of the capsule caps (206) under the application of a slight force/pressure.

Figure 9:
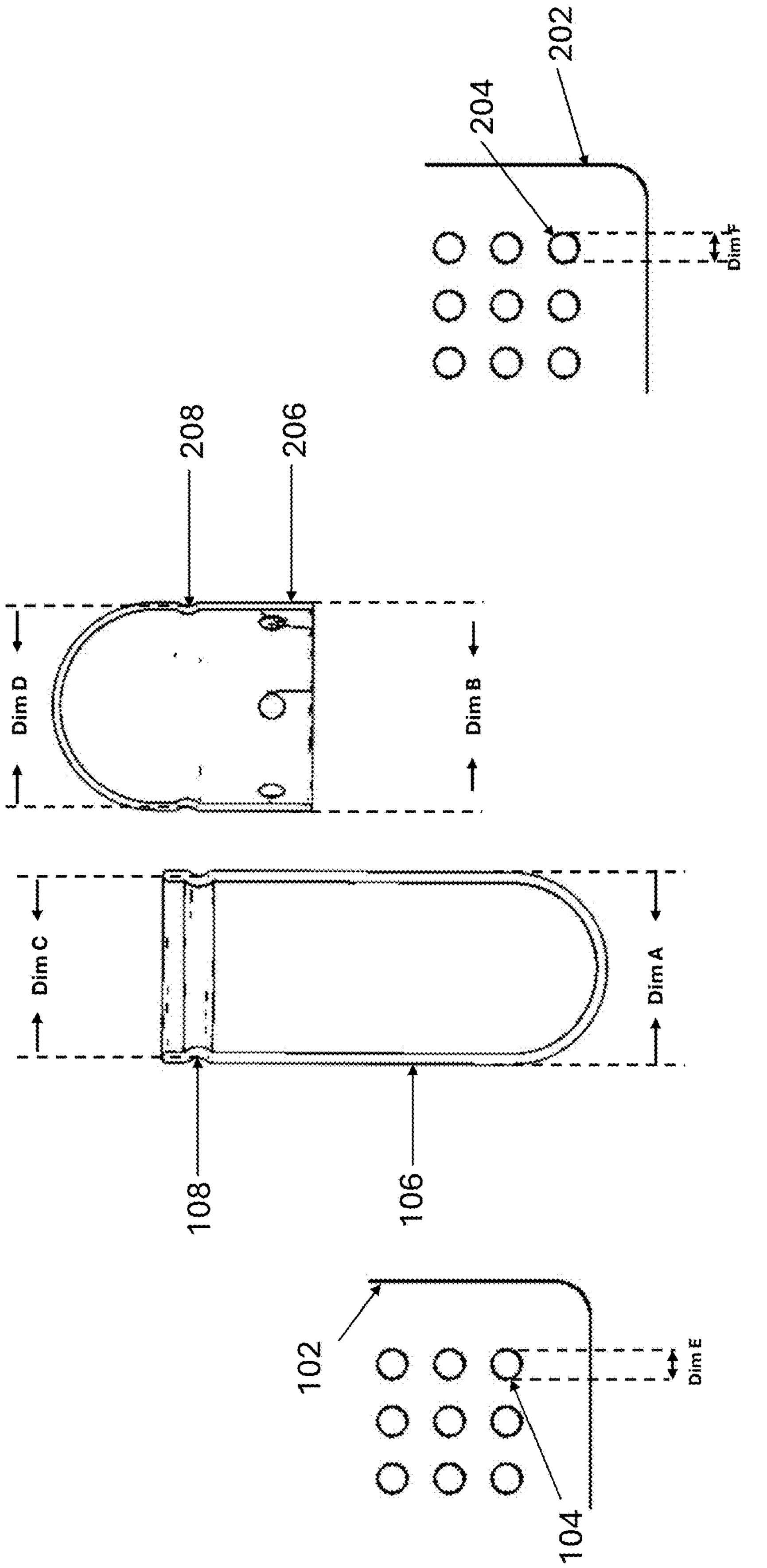
FIG. 9 is a diagram illustrating the structure and components of a hard-shell gelatin capsule, including the capsule body and capsule cap, in accordance with embodiments of the present disclosure.

FIG. 9 depicts a side view of the capsule body (106) and capsule cap (206), as well as the capsule body locking ring (108) and the capsule cap locking ring (208. The capsule body locking ring (108) and capsule cap locking ring (208) are the concaved shapes that allow the capsules to snap into the capsule cap sheet (202) and capsule body sheets (102) securely. The diameter of the capsule cap locking ring (208) and capsule body locking ring (108), are a fraction of a millimetre smaller than the capsule cap (206) and capsule body (106), so that the capsule snaps together during assembly. These are common features for all hard-shell capsules in the market and can be utilized to hold the capsule caps (206) and capsule bodies (106) in their respective capsule sheets.

As shown in FIG. 9, diameter of the aperture for capsule body, diameter of aperture for capsule cap are represented as Dim E and Dim F, respectively. The diameter of capsule body locking ring (108) and diameter of capsule cap locking ring (208) are represented as Dim C and Dim D, respectively. The outer diameter of the capsule body (106) and capsule cap (206) are represented by Dim A and Dim B, respectively. Common dimensions for capsules are listed in the Appendix I of this document (below). The capsule dimensions provided in Appendix I of this document are merely examples and should not be interpreted as limiting in any way.

The diameter of the capsule body and cap are slightly larger than the capsule sheet aperture diameters, ensuring a snug fit when they are inserted through the openings, and the capsule sheet can be flexible to accommodate the insertion of the capsule elements. However, when the locking ring align the capsule sheet, the capsule elements get locked or snapped into a locked position and are held securely until released, but not so tight that they would break when pressure is applied to release them.

The capsule body sheet (102) and capsule cap sheet (202) are of a pliable nature and can be flexible when the capsule elements (i.e. capsule body (106), capsule cap (206)) are pushed through the apertures in their respective holding sheets (102, 202). Therefore, the capsule elements are held in place in their appropriate holding sheets, the diameter of the capsule sheet apertures (104, 204) must be small enough relative to the outer diameter of each capsule element (106, 206) so that the capsule elements do not unintentionally release from the capsule sheets, but large enough so that the capsule elements (106, 206) can pass through the capsule apertures (104, 204) without damaging or distorting the capsule elements, and can be released only when force is applied to release the capsule elements from the capsule sheets. Passing the capsule elements through the capsule apertures results in the capsule locking rings (108, 208) aligned with the pliable capsule sheet. FIGS. 4 and 8 demonstrate a capsule element align with the pliable capsule sheets (102, 202) after being passed through the apertures.

The diameter of the capsule locking rings (108, 208) is slightly smaller than the outer diameter of the capsule body (106) and capsule cap (206), respectively. The diameter of the capsule locking rings (108, 208) are slightly smaller than the diameters of the capsule sheet apertures (104, 204) so that the capsule elements are held firmly in place in the capsule holding sheets. The diameter of each aperture for the capsule element is equal to or greater than the diameter of the locking ring of the capsule cap and capsule body.

The diameter of aperture (204) of the capsule sheet (202) is slightly smaller than the diameter of a capsule cap (206). The locking ring (208) of the capsule cap is a slightly smaller diameter than the capsule cap (206), so that the capsule cap (206) can be pushed through the capsule aperture (204) in the pliable capsule sheet (202) by a force of at least 5 lbs, and the capsule cap locking ring (208) is in line with the capsule sheet (202). The locking ring (208) of the capsule cap (206) has a diameter slightly smaller diameter than that of the capsule cap (206).

Figure 10:
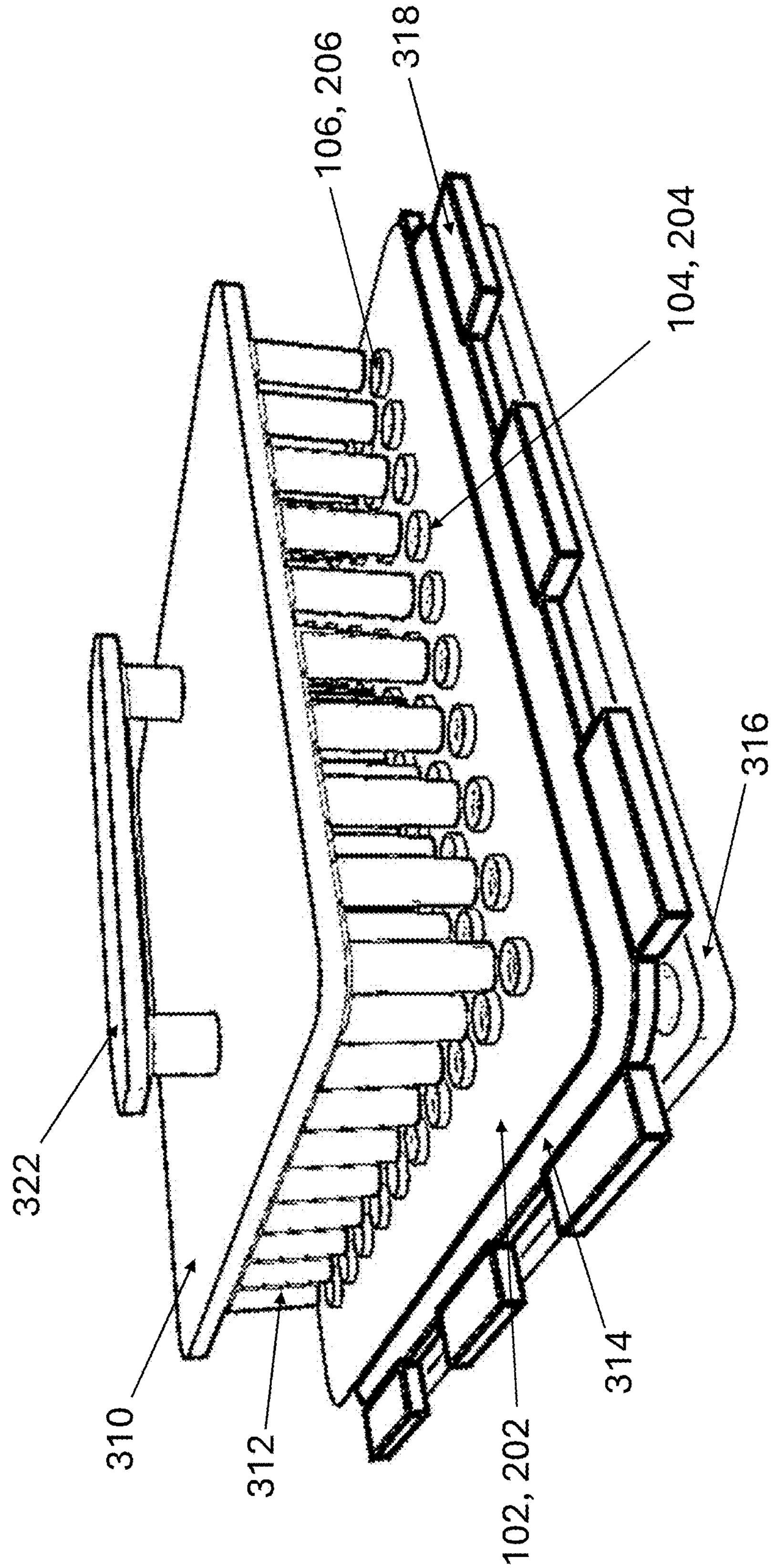
FIG. 10 is a diagram illustrating a perspective view of the complete manual capsule filling machine and capsule release device and system to load capsule bodies and capsule caps into a manual capsule filling machine, in accordance with embodiments of the present disclosure.

FIG. 10 depicts a capsule release system applicable for both the capsule body sheet (102) and the capsule cap sheet (202), to eject the capsule body (106) from the capsule body sheet (102), and the capsule cap (206) from the capsule cap sheet (202), into the capsule filling tray (316). The tamper (310) is used to eject each capsule half (capsule body (106), capsule cap (206)) from the capsule sheets (102, 202) into the capsule filling tray (316). Tamper (310) has tamper pegs (312) which are inserted into capsule bodies (106) and capsule caps (206) being held. With pressure placed downward from the capsule pegs (312) into the capsule bodies (106) and capsule caps (206), the capsule release tray (314) is lifted upwards utilizing the release tray handles (318), therefore releasing the capsules caps (106) and capsule bodies (206) into the capsule filling tray (316). Next, the powder/supplement is poured into each capsule body (106) and filled to the desired volume. When the capsule bodies (106) are filled with the desired volume, the capsule caps (206) are placed on top of the capsule bodies (106), using the manual capsule filling machine. To allow this, the outer diameter of the capsule body (106) has size approximately the same as the inner diameter of the capsule cap (206), so that the open end of the capsule cap (206) can fit over the open end of the capsule body (106). Once the capsule caps (206) are in line with the capsule bodies (106), downward pressure is applied to advance each capsule cap (206) so that the capsule cap locking ring (208) of the capsule cap (206) touches the capsule body locking ring (108) of the capsule body (106).

Figure 11:
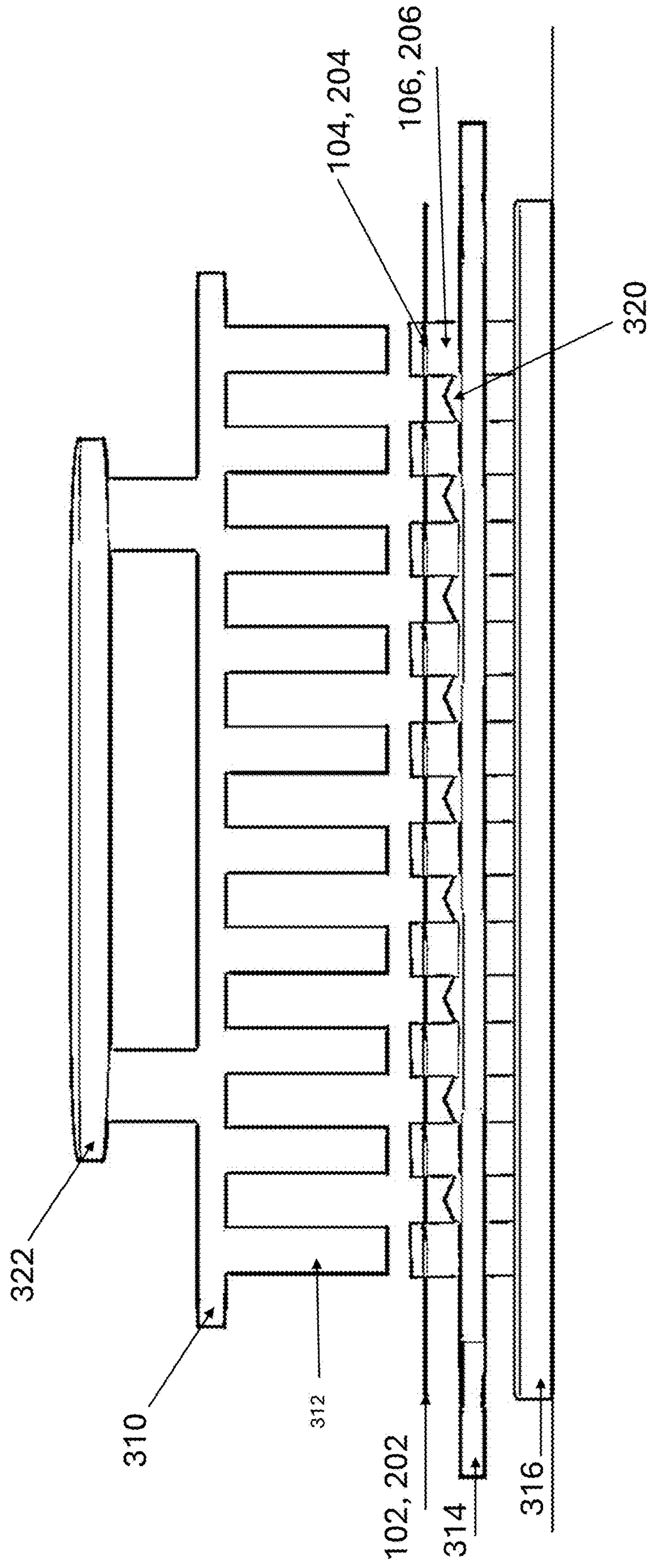
FIG. 11 is a diagram illustrating a side view of the complete manual capsule filling machine and capsule release device and system to load capsule bodies and capsule caps into a manual capsule filling machine, in accordance with embodiments of the present disclosure.

FIG. 11 depicts a side view of the capsule release system, where tamper (310) is used to release the capsule bodies (106) and capsule caps (206) from the capsule body sheet (102) and capsule cap sheet (202), respectively, into the capsule filling tray (316), which has a diameter designed to hold the capsule body (106) and capsule cap (206). The tamper pegs (312) are inserted into the capsule bodies (106) and capsule caps (206). With pressure placed downward from the capsule pegs (312) through holding onto the tamper handle (322) into the capsule bodies (106) and capsule caps (206), the capsule release tray (314) is lifted upwards utilizing the release tray handles (318), thereby releasing the capsules bodies (106) and capsule caps (206) into the capsule filling tray (316) for filling. In a manual capsule filling machine, there is one capsule filling tray (316) dedicated to the capsule bodies (106), and a separate capsule filling tray (316) dedicated to the capsule caps (206). Therefore, it is a two-sheet system: there is one sheet (102) dedicated to holding the capsule bodies, and one sheet (202) dedicated to holding the capsule caps. The process to release all capsule elements (capsule bodies (106) and capsule caps (206)) from the capsule body sheet (102) and capsule cap sheet (202), respectively, into the corresponding capsule filling trays (316) of the manual capsule filling machine requires two steps: 1) releasing the capsule bodies (106) of the capsules from the capsule body sheet (102), and 2) releasing the capsule caps (206) from the capsule cap sheet (202) into the corresponding manual capsule filling tray dedicated to the capsule bodies (106) and capsule caps (206). The elevated points (320) assist in applying upward pressure on capsule body sheet (102) and capsule cap sheet (202) so that the capsule bodies (106) and capsule caps (206) are released from capsule body sheet (102) and capsule cap sheet (202).

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

APPENDIX I

| | | Capsule Size: | | | | | | | |
|---|---|---|---|---|---|---|---|---|---|
| | | 000 | 00 | 0 | 1 | 2 | 3 | 4 | 5 |
| Capsule Outer Diameters: | | | | | | | | | |
| Dim A | Capsule body | 9.55 | 8.18 | 7.34 | 6.63 | 6.07 | 5.57 | 5.05 | 4.68 |
| Dim B | Capsule cap | 9.91 | 8.53 | 7.65 | 6.91 | 6.35 | 5.82 | 5.32 | 4.91 |

APPENDIX I-continued

| | | Capsule Size: | | | | | | | |
|---|---|---|---|---|---|---|---|---|---|
| | | 000 | 00 | 0 | 1 | 2 | 3 | 4 | 5 |
| Capsule Locking Ring Diameter: | | | | | | | | | |
| Dim C | Capsule body locking ring diameter | 9.35 | 7.98 | 7.14 | 6.43 | 5.87 | 5.37 | 4.85 | 4.48 |
| Dim D | Capsule cap locking ring diameter | 9.71 | 8.33 | 7.45 | 6.71 | 6.15 | 5.62 | 5.12 | 4.71 |
| Capsule Sheet Aperture Diameter: | | | | | | | | | |
| Dim E | Capsule body aperture | 9.43 | 8.06 | 7.22 | 6.51 | 5.95 | 5.45 | 4.93 | 4.56 |
| Dim F | Capsule cap aperture | 9.77 | 8.39 | 7.51 | 6.77 | 6.21 | 5.68 | 5.18 | 4.77 |

All dimensions in millimeters (mm)

I claim:

1. A capsule-loading system, comprising:
a capsule sheet comprising a plurality of apertures arranged in a grid pattern, each aperture having an inner wall defining an open diameter of the aperture;
a plurality of capsule halves selected between a capsule cap and a capsule bottom, each capsule half having a generally cylindrical sidewall whose outer diameter is greater than the diameter of each aperture of the plurality of apertures, and an annular recess disposed in the sidewall whose diameter is less than the diameter of the sidewall;
wherein when the capsule half is advanced into one of the plurality of apertures under an urging force, the capsule half is securely held in an upright orientation through the engagement of the inner wall of the aperture and the annular recess of the capsule half.

2. The capsule-loading system of claim 1, wherein each of the capsule cap and the capsule bottom comprises the annular recess, such that when the annular recess of the capsule cap engages with the annular recess of the capsule bottom, the top and bottom halves lock together to form a closed capsule.

3. The capsule-loading system of claim 1, wherein the annular recess of the capsule cap or capsule bottom is utilized to maintain an upright orientation of the capsule cap or the capsule bottom within the aperture of the capsule sheet.

4. The capsule-loading system of claim 1, wherein the capsule sheet is pre-loaded with capsule caps or capsule bottoms, allowing the capsule sheet to be directly placed into a capsule filling machine.

5. The capsule-loading system of claim 1, wherein:
the capsule half is releasable from the corresponding aperture upon application of a predetermined pressure on the capsule half; or
each of the capsule halves are releasable from the capsule sheet by a downward pressure exerted by a capsule filling machine.

6. The capsule-loading system of claim 1, wherein the capsule sheet is made of a flexible or semi-rigid plastic material, and each of the plurality of apertures of the capsule sheet are dimensioned to provide a snap-fit engagement with the corresponding annular recess of the capsule half.

7. A capsule-loading system, the system comprising:
a capsule sheet comprising a plurality of capsule elements, wherein each of the capsule elements comprises a generally cylindrical sidewall and an annular recess about the generally cylindrical sidewall, wherein the capsule sheet comprises a plurality of apertures defined by an inner-aperture wall and arranged in a grid pattern, each of the plurality of apertures being sized such that the inner-aperture wall engages the annular recess of the capsule element when the capsule element is urged into the aperture, thereby securely holding and positioning the capsule element of the plurality of capsule elements in an upright orientation; and
wherein for each of the plurality of capsule elements:
a diameter of the annular recess of the capsule element is less than a diameter of each aperture, and
a diameter of the generally cylindrical sidewall is greater than the diameter of each aperture.

8. The capsule-loading system of claim 7, wherein each of the plurality of capsule elements comprises the annular recess; and
wherein the annular recess allows the capsule element and the corresponding aperture to lock the orientation of, and securely hold the capsule element.

9. The capsule-loading system of claim 8, wherein each capsule element comprises a capsule body, wherein the diameter of the annular recess of the capsule body is less than a diameter of the remainder of the generally cylindrical sidewall of the capsule body, and wherein the diameter of each aperture is less than the diameter of the remainder of the capsule body, exclusive of the annular recess.

10. The capsule-loading system of claim 8, wherein each capsule element comprises a capsule cap, wherein the diameter of the annular recess of the capsule cap is less than a diameter of the remainder of the capsule cap, and wherein the diameter of each aperture is greater than the diameter of the annular recess of the capsule cap.

11. The capsule-loading system of claim 7, further comprising a capsule filling tray associated with a corresponding grid pattern so as to receive the plurality of capsule elements from the capsule sheet.

12. The capsule-loading system of claim 11, comprising a tamper removably coupled with the capsule sheet on an upper side of the capsule sheet to inject each capsule element from the capsule sheet into the capsule filling tray.

13. The capsule-loading system of claim 12, wherein the tamper comprises a plurality of tamper pegs, each tamper peg being sized for insertion within a corresponding capsule element of the plurality of capsule elements.

14. The capsule-loading system of claim 13, wherein the tamper pegs are arranged in a second grid pattern matching with the grid pattern of the plurality of apertures.

15. The capsule-loading system of claim 12, further comprising:

a release tray removably coupled with the capsule filling tray and the capsule sheet, and wherein during the injection of the plurality of capsule elements from the capsule sheet to the capsule filling tray, the tamper and the release tray are moved towards each other, causing injection of the plurality of capsule elements from the capsule sheet to the capsule filling tray.

16. A capsule-loading system comprising:

a first rigid sheet having a plurality of apertures of a first diameter arranged in a grid;

a plurality of capsule halves, each capsule half having (a) a generally cylindrical sidewall whose outer diameter is greater than the first diameter, and (b) an annular detent recessed relative to the sidewall and having a second diameter less than the first diameter; and wherein, upon insertion of each capsule half into a respective aperture, the sidewall frictionally engages the aperture until the annular detent axially registers with the aperture, at which point the detent bears against the sheet and retains the capsule half in an upright orientation suitable for filling; and wherein the capsule half is removable from the sheet by application of a downward force sufficient to overcome the frictional engagement.

17. The capsule-loading system of claim 16, further comprising:

a second rigid sheet having a second plurality of apertures of a third diameter arranged in a grid that corresponds in number and arrangement of the grid of the first rigid sheet;

a second plurality of capsule halves, each second capsule half having (a) a generally cylindrical sidewall whose outer diameter is greater than the third diameter, and (b) an annular detent recessed relative to the sidewall and having a fourth diameter that is less than the third diameter;

wherein, upon insertion of each second capsule half into a respective aperture of the second rigid sheet, the sidewall frictionally engages the aperture until the annular detent axially registers with the aperture, thereby retaining the second capsule half in an orientation facing a corresponding capsule half held by the first rigid sheet; and wherein, with the grids in registration, movement of the first and second rigid sheets toward one another causes opposed capsule halves to telescopically interfit, thereby forming closed capsules.

18. The capsule-loading system of claim 17, further comprising:

a tamper having a plurality of elongate pegs, the elongate pegs being arranged in a grid that corresponds in number and arrangement to the grid of the first and second rigid sheets;

wherein upon advancing the tamper toward the first or the second rigid sheet, each elongate peg confronts a corresponding capsule half, and urges the capsule from the first or second rigid sheet.

* * * * *